April 29, 1958

J. LIEBEL 2,832,325

INTERNAL COMBUSTION ENGINE

Filed June 1, 1956

INVENTOR.
JULIUS LIEBEL,
BY
ATTORNEYS.

United States Patent Office 2,832,325
Patented Apr. 29, 1958

2,832,325

INTERNAL COMBUSTION ENGINE

Julius Liebel, Nurenberg, Germany

Application June 1, 1956, Serial No. 588,850

Claims priority, application Germany June 7, 1955

5 Claims. (Cl. 123—32)

This invention relates to internal combustion engines, and more particularly to a fuel-injection engine of the general type set forth and described in the copending application of Sigfried Meurer et al., Serial No. 480,432, filed January 7, 1955. Such an invention is characterized by the fact that a substantial portion of the injected liquid fuel is spread as a film on the wall of the combustion chamber. Swirling motion is imparted to the air in the combustion chamber, and the fuel evaporates from the film into such air under conditions designed to promote conversion of the liquid fuel into gaseous form before it has been raised to the temperature which would result in its decomposition.

It is an object of this invention to improve the control over the rate of fuel-vaporization in an engine of the type described, especially to promote the elimination of pressure peaks during combustion and an approach to the maintenance of uniform-pressure in the engine cylinder during the course of combustion.

In carrying out the invention, I increase the effective fuel-receiving and fuel-retaining ability of the combustion-chamber wall by forming such wall of a porous material capable of being permeated by the liquid fuel deposited upon it. Preferably, the surface of the combustion-chamber wall is a sintered material so formed, in respect to porosity and grain size, that it will act, more or less like a sponge, to soak up part of the liquid fuel deposited on the wall of the combustion chamber and then release such fuel as vaporization takes place from the surface into the current of air or mixed air and fuel vapor circulating in the combustion chamber.

Figure 1:
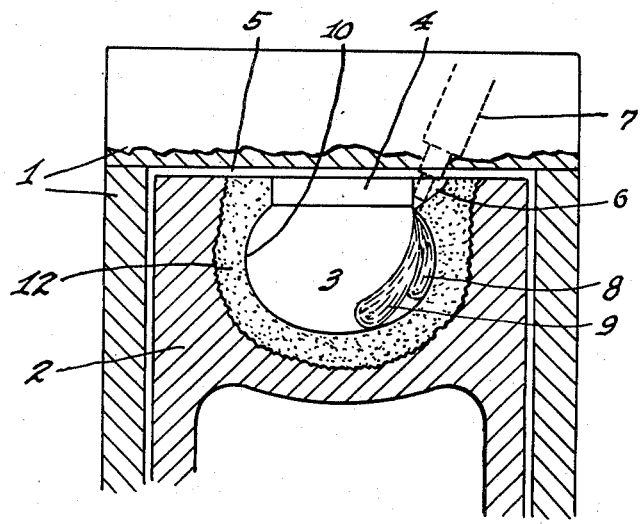
Figure 2:
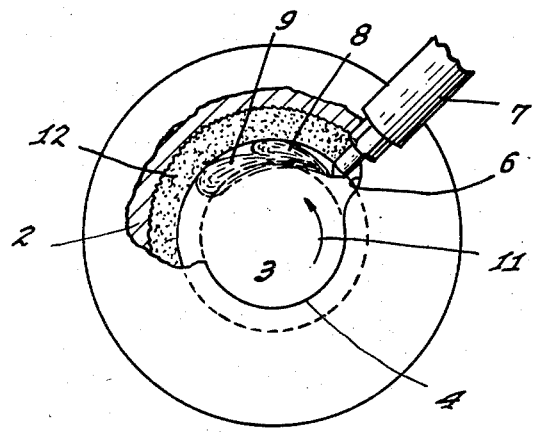

In the accompanying drawing, which illustrates a preferred construction:

Fig. 1 is an axial section through the cylinder and piston of an engine embodying my invention; and Fig. 2 is a plan view of the piston with parts thereof broken away and showing in section.

The engine illustrated in the drawing embodies a cylinder 1 receiving a reciprocable piston 2 in the head of which a combustion chamber 3 is formed. Preferably, the combustion chamber has the form of an oblate spheroid and communicates through a neck 4 of reduced diameter with the interior 5 of the engine cylinder. At one point of the periphery of the neck 4, the piston is notched, as indicated at 6, to provide for the reception at top dead-center, of the fuel-injection nozzle 7. As set forth more particularly in the aforesaid Meurer et al. prior application, the fuel nozzle 7 is preferably one which discharges a plurality of jets, such as are indicated at 8 and 9, directed tangentially of the wall 10 of the combustion chamber 3 to form a liquid film on such chamber-wall. Again as more particularly set forth in said Meurer et al. application, the engine is so constructed that, at the time of ignition, the air in the combustion chamber 3 has a rotary motion, indicated by the arrow 11, which causes it to sweep over the liquid film deposited on the surface of the liquid combustion chamber and promote the gradual vaporization of such fuel.

According to the present invention, the surface 10 of the combustion chamber is the inner surface of a chamber-lining 12 of a porous material capable of withstanding the heat and pressure to which it will be subjected in use. Preferably, the lining 12 is a sintered material firmly bonded to, or even partially imbedded in, the metal of the piston 2. Pores of the lining 12 are of sufficient size, preferably macroscopic, and constitute a sufficient proportion of the total volume of the lining, to permit a substantial absorption into the lining of the liquid fuel from the jets 8 and 9. Desirably, the lining comprises about 60 percent voids.

In the operation of an engine embodying my invention, liquid fuel is injected into the combustion chamber through the nozzle 7 near top dead-center of the piston stroke, the injected fuel being directed tangentially of the wall of the combustion chamber and spread on the surface thereof. Because of its porous nature, the lining 12 absorbs some of the fuel thus deposited, such absorption being promoted by the pressure increased which occurs in the combustion chamber as the piston attains dead-center and by the further pressure-increase which follows combustion. As fuel evaporates from the surface 10, the fuel in the pores of the lining emerges therefrom and vaporizes. The comparatively rough character of the surface 10, resulting from the nature of the lining, increases the surface effect; and the fuel thus vaporizes under more favorable circumstances than if the chamber wall were smooth.

The advantage of the invention lies in the fact that, in the overall course of combustion, cylinder-pressures are increased in uniformity.

It is to be understood that the specific construction illustrated in the drawing and above described is set forth merely by way of example and that the invention is not limited to combustion chambers of any specific shape or location.

I claim as my invention:

1. In an internal combustion engine of the fuel-injection type having a combustion chamber and fuel-supplying means for distributing liquid fuel over the surface of said combustion chamber as a thin film, the wall of said combustion chamber being porous and capable of temporarily absorbing some of the liquid fuel distributed over it by said fuel-supplying means.

2. An internal combustion engine as set forth in claim 1 wherein the combustion chamber is lined with a layer of sintered material providing said porous wall.

3. An internal combustion engine as set forth in claim 2 with the addition that said sintered material possesses about sixty percent voids.

4. In an internal combustion engine of the fuel-injection type having a combustion chamber and fuel-supplying means for distributing liquid fuel over the surface of said combustion chamber, the wall of said combustion chamber being formed of a continuous layer of porous material possessing about sixty percent voids.

5. In an internal combustion engine of the fuel-injection type having a combustion chamber for receiving a swirling mass of air and also having fuel-supplying means for distributing liquid fuel as a film on the wall of said combustion chamber for exposure to the swirling air, the wall of said combustion chamber being granulitic in character and comprising a multiplicity of small depressions distributed longitudinally and transversely of the fuel-film to increase the effective surface area of the fuel-film exposed to the swirling air.

References Cited in the file of this patent

UNITED STATES PATENTS 1,320,064    Junkers _____ Oct. 28, 1919